United States Patent [19]
Richards

[11] Patent Number: 5,085,443
[45] Date of Patent: Feb. 4, 1992

[54] LABYRINTH SEAL

[75] Inventor: Robert L. Richards, Dickinson, Tex.

[73] Assignee: Amoco Corporation, Chicago, Ill.

[21] Appl. No.: 529,895

[22] Filed: May 29, 1990

[51] Int. Cl.$^5$ .............................................. F16J 15/447
[52] U.S. Cl. ................................. 277/53; 277/207 R; 277/173; 277/177; 277/79
[58] Field of Search ...................... 277/53, 57, 55, 97, 277/207 R, 214, 215, 70, 71, 72 R, 79, 200, 201, 211, 173, 208, 177; 415/173.5, 174.5, 174.2

[56] References Cited

U.S. PATENT DOCUMENTS

| | | | |
|---|---|---|---|
| 1,354,235 | 9/1920 | Bonom | 277/57 |
| 1,392,035 | 9/1971 | Williams | 277/70 |
| 2,321,927 | 6/1943 | McCoy et al. | 277/70 |
| 2,543,615 | 2/1951 | Trumpler | 277/53 |
| 2,670,973 | 3/1954 | Ginther et al. | 277/201 |
| 2,988,148 | 6/1961 | Conrad et al. | 277/70 |
| 3,678,809 | 7/1972 | Doutt | 277/71 X |
| 3,831,950 | 8/1974 | Bentley et al. | 277/211 X |
| 3,907,307 | 9/1975 | Maurer et al. | 277/71 X |
| 3,944,235 | 3/1976 | Gordon | 277/233 X |
| 3,971,563 | 7/1976 | Sugimura | 277/54 X |
| 4,022,479 | 5/1977 | Orlowski | 277/53 |
| 4,337,951 | 7/1982 | Perego | 277/53 X |
| 4,337,956 | 7/1982 | Hopper | 277/70 X |
| 4,432,925 | 2/1984 | Holtzberg et al. | 277/DIG. 8 X |
| 4,576,386 | 3/1986 | Benson et al. | 277/165 |
| 4,706,970 | 11/1987 | Ramirez | 277/205 |
| 4,946,737 | 8/1990 | Lindeman et al. | 277/DIG. 6 X |
| 4,976,444 | 12/1990 | Richards | 277/53 |

FOREIGN PATENT DOCUMENTS

| | | | |
|---|---|---|---|
| 2432003 | 1/1976 | Fed. Rep. of Germany | 277/200 |
| 8909357 | 10/1989 | PCT Int'l Appl. | 277/79 |
| 0830064 | 5/1981 | U.S.S.R. | 277/53 |
| 2021211 | 11/1979 | United Kingdom | 277/53 |

Primary Examiner—William A. Cuchlinski, Jr.
Assistant Examiner—J. Folker
Attorney, Agent, or Firm—Gary C. Cunningham; William H. Magidson; Ralph C. Medhurst

[57] ABSTRACT

This invention relates to a labyrinth seal comprising a first side in alignment with a radial axis and a second side opposite said first side, said first and said second side each including an inclined tooth, and an inner-axial surface in alignment with an axial axis and an outer-axial surface opposite said inner-axial surface having at least one hole extending to said inner-axial surface, said inner-axial surface including a plurality of teeth extending substantially inwardly toward the axial axis having grooves therebetween.

18 Claims, 4 Drawing Sheets

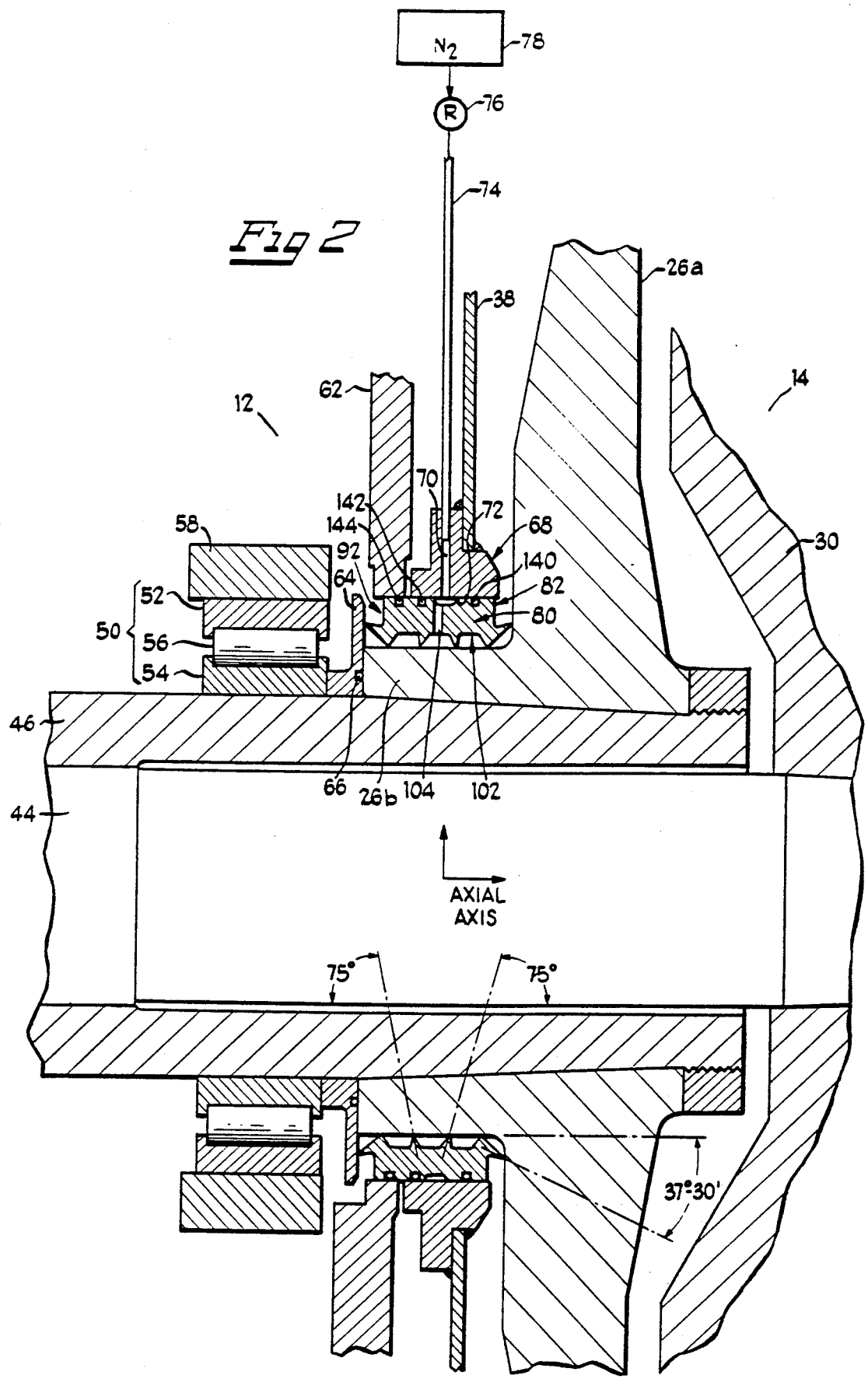

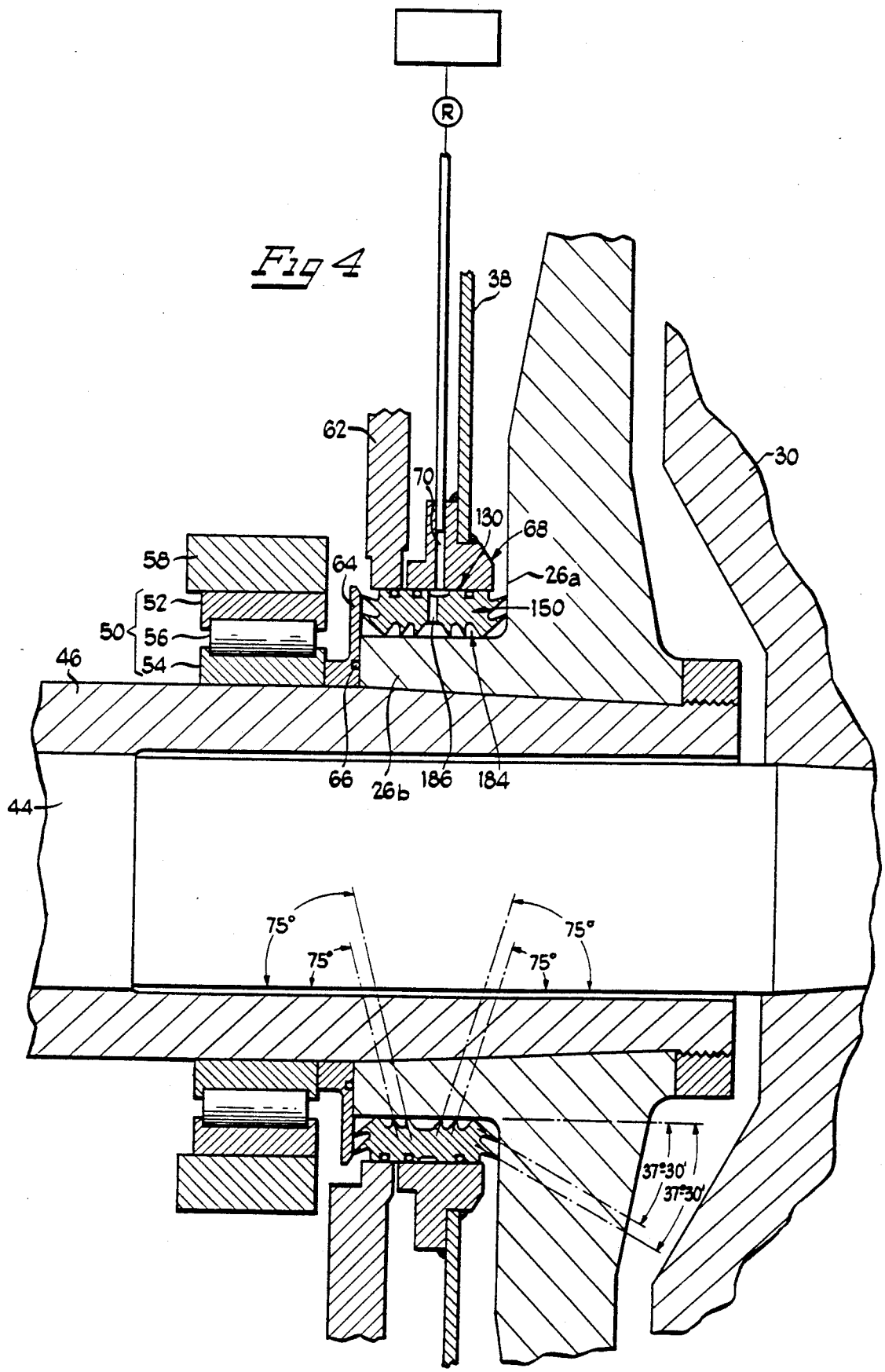

LABYRINTH SEAL

FIELD OF THE INVENTION

This invention relates to a labyrinth seal comprising a first side in alignment with a radial axis and a second side opposite said first side, said first and said second side each including an inclined tooth, and an inner-axial surface in alignment with an axial axis and an outer-axial surface opposite said inner-axial surface having at least one purge opening extending to said inner-axial surface, said inner-axial surface including a plurality of teeth extending substantially inwardly toward the axial axis having grooves therebetween.

BACKGROUND OF THE INVENTION

In various types of machinery, it is continuously a problem to seal the opening through which a rotatable shaft protrudes. The problem is manifested in the difficulty of preventing leakage or loss of pressure or loss of vacuum while at the same time avoiding undue shaft friction. The shaft friction can generate heat, cause loss of power, and even damage the machinery. One method of effecting a seal at a joint between a stationary element and a rotatable shaft has been through the use of packing, stuffing, or the like.

In rotary pumps, fans, compressors, agitators, and the like, a shaft projects through a casing in a region known as the "stuffing box" or "packing box." These terms were derived from the fact that in order to separate two environments, for example, to prevent leakage from one environment in a pump into another, and that within the pump and the atmosphere, material had to be stuffed or packed around the shaft where it passed through the casing. However, packing or stuffing causes considerable friction on the shaft.

Another method of effecting a seal has been to utilize O-rings. However, O-rings have presented a problem due to the difficulty of providing a proper material to accommodate the wear thereon when utilized with shafts that operate at high speed.

Typifying many of these prior art seals are those found in U.S. Pat. Nos. 4,371,176; 4,427,203; 1,011,671; 3,979,128; 4,501,431; 3,871,666; 4,726,696; 3,194,571; 4,545,764; 3,831,950; 3,445,121; 4,257,617; and 4,501,431. Also, many of these seals are found in European Patent No. 724,301, German Patent No. 3,420,523, German Patent No. 884,262, and Japanese Patent No. 180,168.

Presently, mechanical seals or wear rings are commonly used for sealing against liquids when using a rotating shaft. These seals consist of radial planar surfaces which are normal to the shaft axis, see for example, the wear rings illustrated in FIG. 3, and *Handbook on Pumps*, October 1954, p. 83. The surfaces cooperate to function as a bearing. These wear rings often are constructed of metal, and therefore inherently possess the danger of "galling" or adhering upon contact, which can occur during start-up or when vibration occurs. This condition can cause a rapid failure of the seal.

During operation, the above seals can easily become worn or deteriorated, and the wear and deterioration can be non-uniform circumferentially about the shaft because of a number of reasons, such as misalignment of the shaft with respect to the machinery with which it is used, the seal becoming out of round or scarring due to rust or scale, or from harsh environments.

A labyrinth seal is another type of mechanical seal which is not fluid-tight but limits leakage by means of a tortuous path. The seal consists of a ring or a series of rings adapted to fit about a shaft with a goal to minimize leakage. A labyrinth seal offering advantages in terms of minimal leakage, is disclosed in commonly assigned, copending application, U.S. Ser. No. 150,222, entitled, *Seal for a Rotatable Shaft*, filed Mar. 25, 1988. This application discloses a dry seal which includes a single, elongated axially monolithic elastomeric sealing element, or a plurality of such sealing elements, each having a shaft side and a casing side. The shaft side is provided with a plurality of radially inwardly extending circumferential fins, each fin tapering towards an apex. The cross-section of each fin in a plane that includes the axis of the shaft is asymmetric. Two spaced fins define therebetween a circumferential purge chamber having at least one inlet which extends through the elastomeric sealing element to the purge chamber. The apices of the fins on each side of the purge chamber point in an axial direction away from the purge chamber. Each fin apex extends to the shaft, with minimal or substantially no clearance, when the seal is positioned about the shaft. Optionally, a plurality of adjacent fins having apices pointing in the same axial direction away from the purge chamber are provided on each side of the purge chamber to define therebetween a sealing chamber or chambers.

Despite the significant advances offered by that seal element, there remains a need for improved seals and assemblies comprising the same, particularly with respect to minimal leakage, long life expectancy and easy fabrication.

It is therefore an object of this invention to provide a self-aligning seal with improved performance and life expectancy, which minimizes friction between a seal and a rotating surface.

It is also an object of this invention to provide a seal which is efficient not only in terms of capabilities, but also in terms of its drastic reduction in down time of expensive machinery used in complex processes.

I have now found that the objects of this invention can be achieved by providing an improved labyrinth seal, which includes: compressible teeth having sufficient lubricity and memory which provide multiple seals on an axial axis and a radial axis for enhanced seal efficiency; a floating feature which allows the seal to float in place within prescribed tolerances and clearances, and which can withstand unstable conditions such as vibration or contact, and superior chemical resistance and mechanical properties.

The present invention thus provides a high efficiency labyrinth seal which minimizes leakage of fluid gas and/or solids along a shaft.

SUMMARY OF THE INVENTION

The seal of the instant invention is a labyrinth seal comprising a first side in alignment with a radial axis and a second side opposite said first side, said first and said second side each including an inclined tooth, and an inner-axial surface in alignment with an axial axis and an outer-axial surface opposite said inner-axial surface having at least one hole extending to said inner-axial surface, said inner-axial surface including a plurality of teeth extending substantially inwardly toward the axial axis having grooves therebetween.

The instant invention also provides a labyrinth seal comprising a first side in alignment with a radial axis and a second side opposite said first side, said first and said second side each including an inclined tooth extending away from an axial axis, and an inner-axial surface in alignment with the axial axis and an outer-axial surface opposite said inner-axial surface having at least one hole extending to said inner-axial surface, said inner-axial surface including a plurality of teeth extending substantially inwardly toward the axial axis having grooves therebetween.

BRIEF DESCRIPTION OF THE DRAWINGS

FIG. 2 is an enlarged partial cross-sectional view of the pusher centrifuge with a labyrinth seal in accordance with principals of the present invention;

FIG. 4 is an enlarged, partial cross-sectional view of a seal in accordance with principles of the present invention.

DETAILED DESCRIPTION OF THE PREFERRED EMBODIMENT

While this invention is susceptible of embodiments in many forms, there are shown in FIGS. 1-4, two embodiments suitable for use in the practice of this invention, with the understanding that the present disclosure is not intended to limit the invention to the embodiments illustrated.

Figure 1:
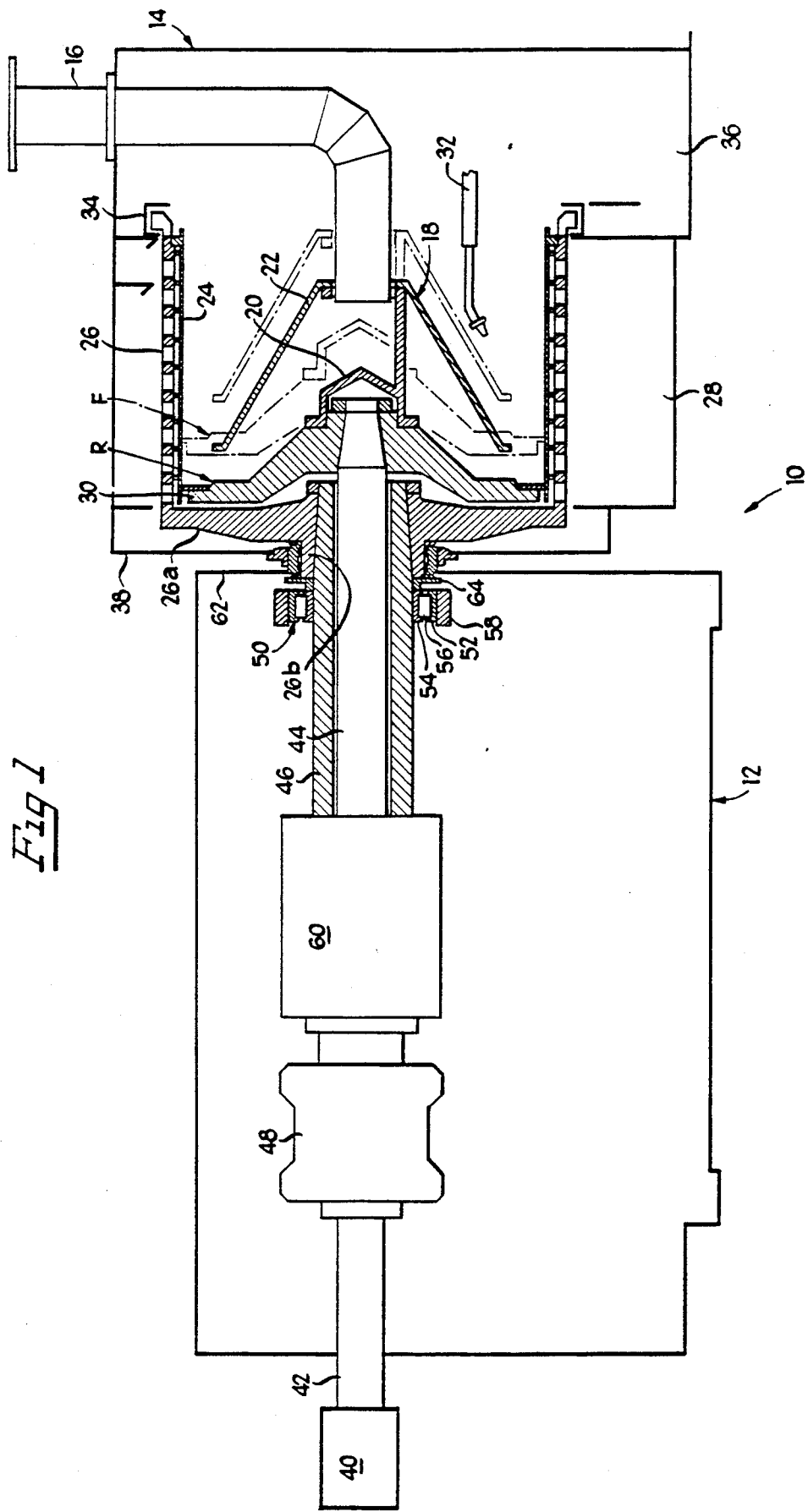
FIG. 1 is a cross-sectional view of a pusher centrifuge with a labyrinth seal in accordance with principals of the present invention.
Figure 3:
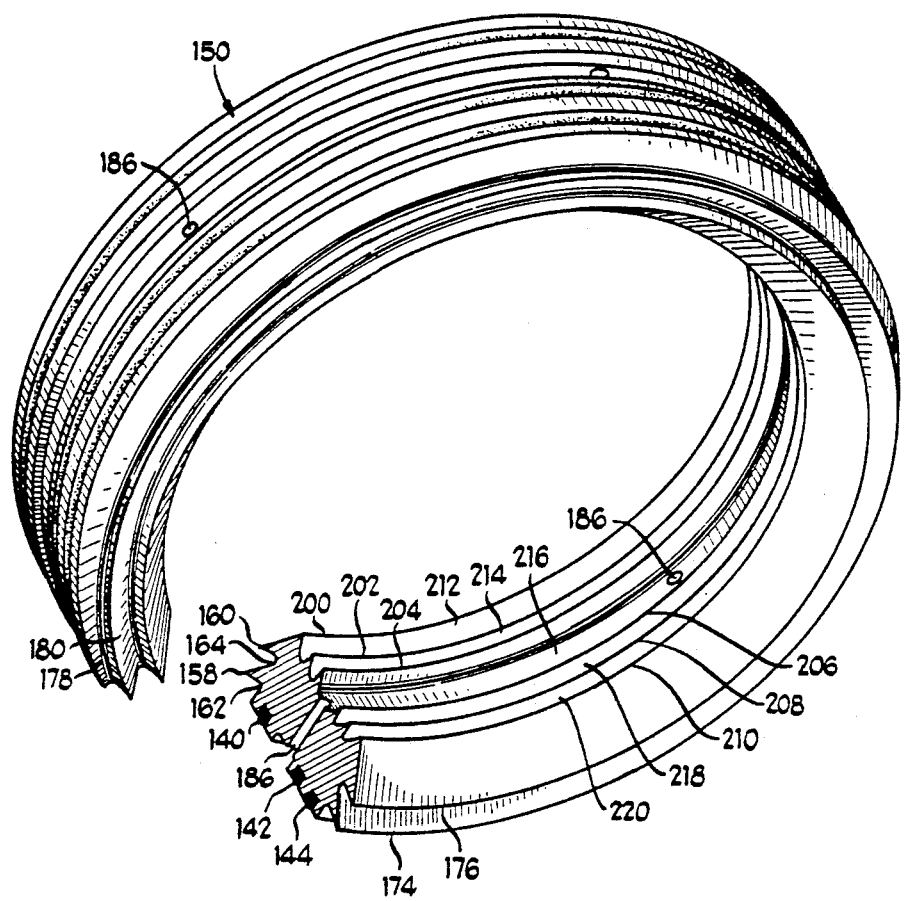
FIG. 3 is an enlarged perspective view partially cut away of the labyrinth seal in accordance with principles of the present invention.

Illustrated in FIG. 1, is a conventional pusher centrifuge 10, which includes a lubricating housing 12 for lubricating the components such as the bearings and supplying the hydraulic system therein, and a process housing 14 for separating solids from liquids.

The process slurry enters the process housing 14 through the feed pipe 16. The slurry smoothly accelerates and is directed outwardly in a radial direction in a rotating feed funnel 18. The rotating feed funnel 18 is bounded by an inner-rotating funnel 20 and an outer-rotating funnel 22, both of which contribute to helping to evenly distribute the slurry and slurry deposits on a filtration screen 24. The screen 24 is supported by the centrifuge basket 26 having openings spaced evenly throughout, and further includes a radial hub section 26a and an axial flange section 26b with an opening in the middle adapted to allowing a shaft to be fit therethrough. Solids collect on the filtration screen 24, and feed liquor drains through the precision slots in the filtration screen 24 and openings of the centrifuge basket 26, and is removed from the machine through a feed liquor drain 28. The feed liquor which is removed through feed liquor drain 28, can be subsequently filtered and recycled through the aforementioned process.

The filtration screen 24 has been constructed to provide a smooth surface for the cake to travel through, with a goal to minimizing sliding friction, abrasive wear and product degradation.

A radially-extending pusher plate 30, is closely fit inside the filtration screen 24. The pusher plate 30 rotates at the same speed as the rotating centrifuge basket 26 and reciprocates. On the forward stroke, the pusher plate 30 pushes the solids along the filtration screen 24 consolidating them in a uniform cake, as illustrated in phantom view, item F in FIG. 1. The rotating feed funnel 18, which includes the inner and outer rotating funnels 20 and 22, is operatively connected to push plate 30, and therefore also rotates and reciprocates with plate 30. On the reverse stroke, the filtration screen 24 is exposed where more slurry separates, item R.

The cake dries as it moves across the filtration screen 24 and a wash liquor can be sprayed on the cake through wash liquor inlet 32, to displace residual mother liquor or remove impurities. At the end of the centrifuge basket 26, the cake is thrown off onto a deceleration ring 34, which directs the solid product to the solids discharge 36.

Figure 2A:
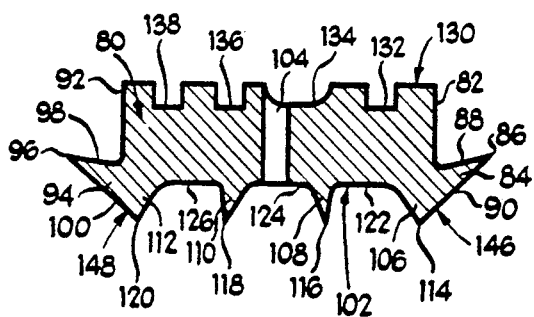
FIG. 2A is an enlarged, partial cross-sectional view of the labyrinth seal of FIG. 2.
Figure 4A:
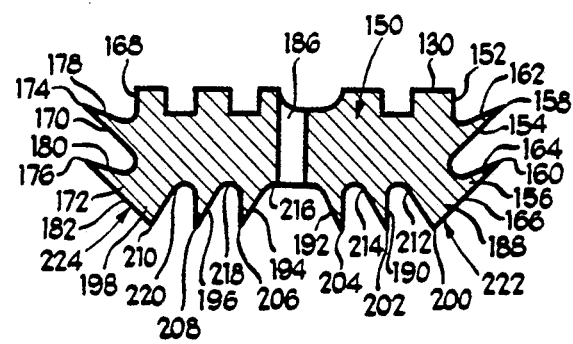
FIG. 4A is an enlarged, partial cross-sectional view of the labyrinth seal of FIG. 4.

The wash liquor inlet 32 comprises several strategically placed inlets which can be used to spray the filtration screen 24 when the cake or solids thereon and therein becomes unbalanced or asymmetric. The inlets 32 wash or melt the cake off the filtration screen 24 when such unbalance occurs. When this undesirable condition occurs in filtration screen 24, severe vibration can result. As will be discussed, an advantage of the inventive labyrinth seals 80 and 150 shown in FIGS. 2A and 4A, is their ability to withstand such unstable conditions.

The pusher centrifuge 10 is efficient, primarily because of continuous operation. Minimal time is lost with charging and discharging operations, and minimal power is wasted with repeated acceleration and deceleration cycles. Continuous operation also takes full advantage of the fly wheel effect of the rotating centrifuge basket 26, to moderate power peaks in the hydraulic system. Another factor contributing to the efficiency of pusher centrifuge 10 is the thickness of cake which it is capable of handling. Thicker cakes mean high throughput rates for a given centrifuge basket 26 size. The thick cake also acts as its own filter, minimizing the loss of fines and minimizing particle degradation.

Referring to FIG. 2, the process housing 14 of centrifuge 10, further includes a radial back plate 38 with an opening adapted to receive the labyrinth seals 80 and 150 of this invention, adjacent to the lubricating housing 12.

As illustrated in FIG. 1, a motor or rotating means 40, is connected to an elongated drive shaft 42. The center line of the shaft 42 defines an axial axis. Perpendicular to the axial axis is the radial axis. Moving axially down the shaft 42 in a direction from left to right in FIG. 1, is an inner rotating and reciprocating shaft section 44, and an outer rotating shaft section 46. The outer rotating shaft section 46 is attached to the centrifuge basket 26 in an appropriate manner, such as by a precision taper to assure concentricity and balance of this rotating member. The inner rotating and reciprocating shaft section 44 is attached to the pusher plate 30, by any appropriate means, such as by a precision taper to also assure concentricity and balance of this rotating and reciprocating member. The shaft 42 is supported by a pair of widely spaced, heavy-duty bearings 48 and 50. Bearing 48 is located on one side of the lubricating housing 12 opposite the process housing 14, and the outer rotating shaft section 46 is carried by an anti-friction rolling element bearing 50 on the other side. The bearing 50 includes an outer race 52, an inner race 54, and a rolling element 56, which is held in place by and supported in support collar 58. The support collar 58 is attached to the lubricating housing 12. Bearing 50 can move axially to accommodate axial movement and expansion of the shaft 42, due to, for example, temperature fluctuations.

Between bearings 48 and 50 is a hydraulic piston or reciprocating means 60. On the forward stroke, the hydraulic piston 60 is activated to push the inner rotating and reciprocating shaft section 44, the pusher plate 30 and the rotating feeding funnel 18 in a direction from left to right as illustrated in phantom as F in FIG. 1, thereby pushing the solids along the filtration screen 24 in a uniform cake there along and eventually to the deceleration ring 34 and solids discharge 36.

On the reverse stroke, the hydraulic piston 60 is activated to pull the inner rotating and reciprocating shaft section 44, the pusher plate 30 and rotating feeding funnel in a direction from right to left, as illustrated as item R in FIG. 1, thereby exposing the filtration screen 24 where more slurry and solids are separated. The speed of the hydraulic piston 60 or number of reciprocating cycles per minute can vary widely. Typically, the hydraulic piston 60 includes about 27 cycles or strokes per minute. The hydraulic piston 60 is powered by a pump located in the lubricating housing 12 and may be belt-driven by a drive motor. Cooling coils can be included in lubricating housing 12 to maintain the hydraulic system temperature at the optimum level, and various pipes are located in proximity to bearings 48 and 50 for lubrication purposes (not illustrated in FIG. 1). The rugged construction of the lubricating housing 12 provides a rigid support for many of the components described herein, and it further encloses, envelopes and defines a hydraulic reservoir, oil splash and oil vapor for activating the hydraulic piston 60 and lubricating bearings 48 and 50.

Referring to FIGS. 2 and 2A, a radially extending-annular flinger 64, is located between bearing 50 inner race 54, and centrifuge basket 26 flange 26b on the outer rotating shaft section 46. The flinger 64 includes a channel for an O-ring 66 for sealing purposes between the flinger 64 and the flange 26b of centrifuge basket 26.

An annular seating means 68 is provided for allowing a labyrinth seal the freedom to float and sit at least partially thereon and therein. The seating means 68 fits in the opening of back plate 38, and includes a purge inlet 70 connected to a purge conduit 74 with a pressure regulating valve 76 located upstream and a gas source 78. The gas source 78 can include air, or preferably an inert gas such as nitrogen. The inert gas source 78 is utilized to maintain a nitrogen blanket in lubricating housing 12 to minimize the possiblity of atmospheric moisture from leaking into such housing 12, thereby substantially preventing corrosion of the components and the deterioration of oil in housing 12. The inert gas pressure downstream of regulating valve 76 can vary widely, but is typically less than about 5 psi, and preferably about 1 psi for consistent, smooth and an even gas flow downstream through purge conduit 74, purge opening 104 of labyrinth seal 80, to lubricating housing 12 and process housing 14.

Referring to FIGS. 2 and 2A, a durable labyrinth seal 80 is illustrated, which can withstand compressing and undesirable vibration. The labyrinth seal 80 includes a first side 82, facing the centrifuge basket 26 hub 26a, in alignment with a radial axis and a second side 92, facing the flinger 64, opposite the first side 82. The first side 82 includes at least one inclined labyrinth or wedge-shaped tooth 84 with an apex 86 and collecting trough or groove 88. On the other side of apex 86, is an inclined surface 90. Similarly, the second side 92 includes an inclined wedge-shaped tooth or labyrinth 94 with an apex 96 and collecting trough or groove 98 on one side of apex 96 and an inclined surface 100 on the other side thereof. The teeth 84 and 94 of the first and second sides 82 and 92 extend in equal and opposite directions with respect to the axial axis. It should be understood by those skilled in the art that the present labyrinth seal can be used in a wide variety of rotational devices, and is not limited to the pusher centrifuge described herein.

The labyrinth seal 80 further comprises an inner-axial surface 102, facing the flange hub 26b of centrifuge basket 26 and an outer axial surface 130 facing base plate 62 and seating means 68. A purge opening 104 extends radially through the labyrinth seal 80 from the inner axial surface 102 to the outer axial surface 130. The inner-axial surface 102 is in alignment with an axial axis and the outer-axial surface 130 is opposite the inner-axial surface 102. In a preferred embodiment, a plurality of radially extending purge openings 104 are included to provide a more consistent, smooth and even flow of inert gas around labyrinth seal 80 to the lubricating and process housings 12 and 14, respectively.

The first and second sides 82 and 92 each include at least one inclined tooth 84 and 94 with apex 86 and 96, respectively, pointing toward the hub 26a of centrifuge basket 26 and flinger 64, respectively, in a direction away from the axial axis. In a preferred embodiment, a plurality of parallel teeth are provided on first and second sides 82 and 92 to provide additional radial seals and additional collection troughs for back up purposes and enhanced longevity. Referring to FIG. 2, the angle at which the center-line running through the middle of teeth 84 and 94 and through the apex 86 and 96, respectively, with respect to the axial axis can very widely, preferably ranging from about 10° to about 50°, and most preferably about 37°. These angles have been found to provide: 1) a circumferential seal that allows the inert gas to leak out from purge opening 104, yet minimizes leakage a) of oil, liquids, solids, gas, etc. to the atmosphere, b) from the process housing 14 to the lubricating housing 12, and c) from the lubricating housing 12 to the process housing 14; 2) collecting trough 88 and 98 of first and second side 82 and 92, respectively, to catch and circumferentially direct the oil droplets, splash and vapor in the lubricating housing 12 around trough 98 to the reservoir in the bottom thereof by gravity, and similarly catch and circumferentially direct the slurry, solids and so forth in process housing 12 around trough 88 to the feed liquor drain 28 by gravity; while 3) minimizing wear and friction to enhance longevity of the labyrinth seal 80.

Referring to FIG. 2A, inner-axial surface 102 includes a plurality of wedge-shaped teeth extending substantially inwardly toward the axial axis with grooves therebetween. The term "plurality" as used herein means more than one. In one embodiment, the plurality of teeth include at least a first tooth 106, a second tooth 108, a third tooth 110, and a fourth tooth 112, each having an apex, or first apex 114, second apex 116, third apex 118, and fourth apex 120, respectively. Between the first and second apices 114 and 116, is a right or secondary circumferential channel 122. Between the second and third apices 116 and 118, is a purge or middle circumferential channel 124, and between the third and fourth apices 118 and 120 is a left or secondary circumferential channel 126. It should be understood by those skilled in the art that the geometric shape and number of teeth 84, 94, 106, 108, 110 and 112 described herein, can vary widely, for example, the teeth can be pointed or rounded, regularly or irregularity spaced, overall dimensions of adjacent teeth can vary, etc. depending on the appropriate application and area available.

As illustrated in FIGS. 2 and 2A, the second and third teeth 108 and 110, have an asymmetric cross-section in a plane that includes the axial axis or center of the shaft 42, as do the first and fourth teeth 106 and 112. The angle at which the center line running through the center of first and fourth teeth 106 and 112 and their respective apices 114 and 120 with respect to the axial axis can vary widely, preferably ranging from about 50° to about 85°, and more preferably at about 75°. Similarly, the angle at which the center-line running through the center of second and third teeth 108 and 110 and their respective apices 116 and 118, with respect to the axial axis can vary widely, preferably ranging from about 50° to about 85°, and more preferably at about 75°. These angles are configured to provide: 1) a circumferential seal that allows the inert gas to leak and throttle outwardly from purge opening 104 to the purge channel 124 to the secondary channels 122 and 126, yet minimizes leakage a) of oil, liquids, solids, gas, etc. to the atmosphere, b) from the process housing 14 to the lubricating housing 12, and c) from the lubricating housing 12 to the process housing 14; while 2) minimizing wear and friction to enhance longevity of the labyrinth seal 80.

The purge channel 124 is in communication with the gas source 78 via the purge conduit 74 and purge inlet 70 of sealing means 68. In a preferred embodiment, there are a plurality of radially extending purge openings 104 spaced substantially equally about the purge channel 124, preferably less than twelve purge openings 104 are provided, and most preferably from about 10 to about 6 for an even and homogeneous flow of gas from source 78 through outer purge channel 134, through purge opening 104, to purge channel 124 and secondary channels 122 and 126.

As illustrated in FIGS. 2 and 2A, a plurality of teeth are provided on each side of the purge channel 124, so that the right and left secondary channels 122 and 126, respectively, define secondary circumferential sealing chambers having an asymmetric cross-section in a plane passing through the axial axis. The volume of the purge channel 124 and each secondary channel 122 and 126 can vary widely. Preferably, the volume ratio of the purge channel 124 to each secondary channel 122 and 126, respectively, is in the range of about 2 to about 0.25, and more preferably the volume of each secondary channels 122 and 126 is about one half of the volume of the purge channel 124, for improved throttling and even leakage of the gas from source 78 through purge opening 104 to purge channel 124, to the secondary channels 122 and 126, and eventually to the lubricating and process housings 12 and 14. Also, in a preferred embodiment, the volume of each secondary channel 122 and 126 is about the same.

The apex of each tooth on the inner axial surface 102 extends inwardly in a direction toward the axial axis and at least partially away from purge opening 104. While the apices 114, 116, 118 and 120 need not contact the flange 26b of centrifuge basket 26, the clearance between each such apex and the flange 26b can be minimal, for example, about 3 mils or less. This provides improved overall sealing characteristics. Since at most, only a relatively small surface area of the labyrinth seal 80 actually contacts the centrifuge flange 26b, the total contact surface between the labyrinth 80 and the centrifuge flange 26b is relatively small in any event, thus minimizing friction and wear. Friction can be further reduced by manufacturing the labyrinth seal 80 of the instant invention, with any material which is capable of withstanding the environments to which the seal will be exposed during use.

Turning now to the outer-axial surface 130, this surface is opposite, parallel and in alignment with the inner-axial surface 102, and includes a plurality of grooves or channels, including from right to left in FIGS. 2 and 2A, a first channel 132, an outer purge distribution channel 134, a second channel 136, and a third channel 138. The first, second, and third channels 132, 136, and 138, are adapted to receive a first, second, and third O-ring 140, 142, and 144, respectively. The first, second, and third O-rings 140, 142, and 144 contribute to minimizing leakage and maintaining a positive seal between seating means 68 and the outer-axial surface 130 of the labyrinth seal 80, while further minimizing premature wear by allowing the labyrinth seal 80 to float in place. In normal use, the labyrinth seal 80, the seating means 68, back plate 38, and base plate 62 are all substantially stationary, while the shaft 42, centrifuge basket 26 and flinger 64 rotate.

The clearance between the outer axial surface 130 and the sealing means 68 is minimal, such as about 15 mils at the top and 15 mils at the bottom for a 30 mil diametral clearance. This clearance has been found: (i) to provide the floating and self adjusting feature previously discussed, and (ii) to be able to withstand 50% more than the maximum anticipated deflection of the centrifuge basket 26 thereby being durable, able to withstand severe vibration excursions, and minimize the possibility of crushing, chipping, and damaging the labyrinth seal 80.

The outer purge distribution channel 134 has been found to provide a homogeneous and steady flow of the gas from source 78 around the labyrinth seal 80 and through the purge openings 104.

A first and second bumper means 146 and 148 provide a large cross-sectional axis which has been specially configured and designed to be able to withstand axial and radial excursions or vibrations with minimal or no damage to the teeth on the inner axial surface 102, as well as the teeth on the first and second sides 82 and 92, respectively. The first bumper means 146 comprises the inclined tooth 84 with collecting trough 88 on one side and inclined surface 90 leading to the first tooth 106 on the other, and first tooth 106. The second bumper means 148 comprises the inclined tooth 94 with collecting trough 98 on one side and inclined surface 100 leading to the forth tooth 112 on the other, and the forth tooth 112. The first and second bumper means 146 and 148 are strategically located where the first side 82 meets the inner axial surface 102 and the second side 92 meets the inner axial surface 102, respectively, to withstand the aforementioned excursions, and further contribute to throttling the gas flow from the purge channel 124 outwardly.

The labyrinth seal 80 can be made of any material which is capable of withstanding the environments to which the seal will be exposed during use and which is sufficiently compressible to allow for flexing of the teeth as needed. Preferably a thermoplastic material which has sufficient mechanical strength and chemical and thermal resistance is used. Examples include aromatic polymers such as polyamides, polyesters and polycarbonates, as well as polyaryl ethers, sulfones, ketones and the like. Most preferably, an amide-imide polymeric material is employed, due to its desirable combination of advantageous characteristics, such as performance from about −320° F. to about +500° F.; outstanding mechanical strength; easy fabrication, e.g., by injection or compression molding or compaction sintering; low flammability; fatigue strength; impact strength; creep resistance; wear resistance; low coefficients of expansion; and excellent thermal stability. Alloying elements such as other thermoplastic materials including polyarylates, polyesters, poly(ether ether ketones), poly(aryl ether ketones), poly(aryl sulfones), poly(aryl ethers), other polyimides and polyamides, and the like, can be included with the polyamides-imides if desired.

The poly(amide-imide) polymers (PAI) are known engineering polymers and can be prepared by reacting components comprising an aromatic tricarboxylic acid compound, such as trimellitic acid (TMA) or 4-trimellitoyl anhydride halide (4-TMAC) and a diamine component comprising at least one wholly or partially aromatic primary diamine. The amide-imide polymers are preferably prepared by reacting an acyl halide derivative of an aromatic tricarboxylic acid anhydride with a largely or wholly-aromatic primary diamine or mixture thereof. The resulting products are polyamides wherein the linking groups are predominantly amide groups, although some may be imide groups, and wherein the structure contains free carboxylic acid groups which are capable of further reaction. Such polyamides are moderate molecular weight polymeric compounds having in their molecules units of:

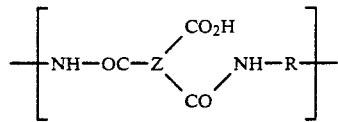

wherein the free carboxyl groups are ortho to one amide group, Z is an aromatic moiety containing 1 to 4 benzene rings or lower-alkyl-substituted benzene rings, R comprises one or more wholly- or largely-aromatic hydrocarbon radicals. These hydrocarbon radicals may be a divalent aromatic hydrocarbon radical of from 6 to about 10 carbon atoms, or two divalent aromatic hydrocarbon radicals each of from 6 to about 10 carbon atoms joined directly or by stable linkages such as —O—, methylene, —CO—, —SO$_2$—, —S—.

The polyamides are capable of substantially complete imidization by heating by which they form the polyamide-imide structure having to a substantial extent recurring units of:

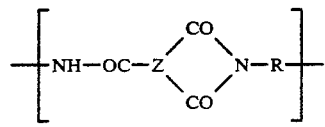

wherein one carbonyl group is meta to and one carbonyl group is para to each amide group and wherein Z and R are defined as above. Typically the polyamides-imides have up to about 50 percent imidization prior to heat treatment, typically about 10 to about 40 percent.

The polyamide-imide copolymers are prepared from an anhydride-containing substance and a diamine component comprising wholly or partially aromatic primary diamines. Usefully the anhydride-containing substance is an acyl halide derivative of the anhydride of an aromatic tricarboxylic acid which contains 1 to 4 benzene rings or lower-alkyl-substituted benzene rings and wherein two of the carboxyl groups are ortho to one another. More preferably, the anhydride-containing substance is an acyl halide derivative of an acid anhydride having a single benzene or lower alkyl-substituted benzene ring, and most preferably, the substance is the acyl chloride derivative of trimellitic acid anhydride (4-TMAC).

When a mixture of diamines is used, such mixture can contain two or more, preferably two or three, wholly- or largely-aromatic primary diamines.

The wholly- or largely-aromatic primary diamines used in preparation of these polyamides-imides comprise an aromatic moiety containing 6 to about 10 carbon atoms or two or more divalent aromatic moieties of from 6 to about 10 carbon atoms, each moiety containing one primary amine group, and the moieties linked directly or through, for example, a bridging —O—, —S—, —SO$_2$—, —CO—, or methylene group. Preferred diamines include oxybisaniline and metaphenelene diamine. When three diamines are used they are preferably selected from the class composed of:

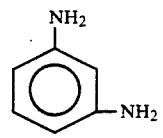

and

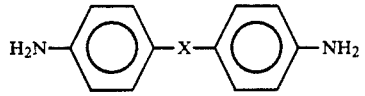

said X being an —O—, —CH$_2$—, or —SO$_2$—group. More preferably, the mixture of aromatic primary diamines is two-component and is composed of meta-phenylene-diamine (MPDA) and p,p'-oxybis(aniline) (OBA), p,p'-methylenebis(aniline) (MBA), and p,p'-oxybis(aniline), p,p'-sulfonylbis(aniline) (SOBA), and p,p'-oxybis(aniline), p,p'-sulfonylbis(aniline) and metaphenylene-diamine, or p,p'-sulfonylbis(aniline) and p,p'-methylenebis(aniline). Most preferably, the mixture of primary aromatic diamines contains metaphenylene-diamine and p,p'-oxybis(aniline). The aromatic nature of the diamines contributes to the excellent thermal properties of the copolymers while the primary amine groups permit the desired imide rings and amide linkages to be formed.

When two diamines are used to achieve a polymer usefully combining properties of both diamines, it is usual to stay within the range of about 10 mole % of the first diamine and 90 mole % of the second diamine to about 90 mole % of the first diamine and 10 mole % of the second diamine. Preferably, the range is about a 20 to 80 mole percent to about an 80 to 20 mole percent. In the preferred embodiment wherein the acyl chloride of trimellitic acid anhydride is copolymerized with a mixture of p,p'-oxybis(aniline) and meta-phenylenediamine, the preferred range is from about 30 mole % of the former and about 70 mole % of the latter to about 70 mole % of the former and about 30 mole % of the latter.

As previously stated, a preferred sealing element 72 comprises a poly(amide-imide) composition, which can be injection or compression molded, or compaction sintered.

Injection molding techniques are known to persons of skill in the plastics fabrication art and are commonly referred to as reciprocating screw injection molding. The general principles of reciprocating screw injection molding are set forth below, it being understood that the description is intended for purposes of illustration.

In reciprocating screw injection molding, powdered or pelletized polymer is delivered to a hopper and from there fed into the feed end of a barrel, typically cylindrical, which houses a screw adapted for rotation and reciprocal motion within the barrel along the length thereof. The barrel also has a nozzle end opposite the feed end, and may have a chamber located near the nozzle end. Polymer fed from the hopper into the barrel passes into and through the area between flights of the rotating screw and, during such passage, is plasticated due to heat and the working of the polymer between the interior surface of the barrel and the surfaces between screw flights. Working of the polymer between screw flights and the interior of the barrel compacts the polymer between screw flights. After passing between the screw flights, the compacted, plasticated polymer accumulates in the barrel or in a chamber near the nozzle.

During rotation of the screw, pressure, commonly referred to as "back pressure," is applied to the end of the screw at the feed end of the barrel. An opposing pressure develops due to accumulation of polymer at the nozzle end of the barrel, and when this pressure exceeds the back pressure, the screw is pushed away from the nozzle.

When the accumulating polymer fills the chamber or the portion of the barrel vacated by the screw, or in some instances, when the screw reaches a pre-determined position, pressure, commonly referred to as "injection pressure," is applied to the screw, and the accumulated polymer is forced through the nozzle into a mold which is commonly heated. In some cases, a booster is used to aid in the injection. Typically, a non-return check valve is employed to prevent polymer from flowing back toward the screw. Following injection of the polymer into the mold, the polymer is held therein, the mold is cooled, and the molded part removed.

The exact conditions under which the polymers described herein are injection molded will vary depending upon the polymer to be molded, the polymer spiral flow, the injection molding equipment employed, and the molded article to be prepared. Typical operating conditions include barrel-set temperatures of from 600° F. to 700° F., injection pressures ranging from 10,000 psi to 30,000 psi and cycle times of between 75 seconds to 180 seconds, depending on the polymer used. Molding cycles also vary depending upon choice of polymer, molding equipment and the like.

Compression molding techniques also are suitable and are well known in the art. See, for example, Amoco Torlon ® Engineering Resins Bulletin, Code Number TAT-2, issued October 1974. In this bulletin, Guidelines for Compression Molding of Torlon powders is disclosed. A standard hydraulic press, with adjustable closing speed, is utilized. A chrome plated, polished, hardened tool steel mold is used to minimize sticking of the polymer to the mold. Prior to molding, and later at regular intervals as required for proper part ejection, a light coat of a high temperature mold release can be applied. The resin is preconditioned by preheating the polymer, for example, to about 530° F. in a hot air oven. Insufficient preheating can result in a defective part caused by trapped moisture or a longer required cycle time. Preheating at too high a temperature causes lumps in the powder. The next step is the molding step, which comprises: 1) Filling a predetermined amount of preheated polymer into a mold preheated to a temperature above the glass transition temperature of the polymer, for example, about 620°–650° F. for certain polyamides-imides. 2) Compressing the polymer using a pressure sufficient to compact the polymer and forcing the polymer to conform to the polymer cavity, for example at approximately 4,000 psi. Minimum pressure requirements will vary somewhat depending on part geometry. 3) Maintaining the applied pressure until all of the polymer is molten and the melt flows throughout the mold. 4) Cooling the mold to below glass transition temperature of the polymer, e.g., about 500° F. And, 5) ejecting the molded part as soon as it has cooled sufficiently. Thereafter, the compression molded ingot can be machined to the desired shape.

The superior chemical resistance and mechanical properties of compression molded polyamides-imides are particularly well-suited for replacement of metal parts in rotating machinery. The lubricity and memory inherent in this polymer is highly desirable for use in the invented sealing element. High efficiency designs can be achieved with this polymer that are difficult to achieve with current metal parts. For example, the invented seal can be mass produced at a modest cost by plunge cutting and gluing pieces together with amide-imide adhesive instead of intricate, multistep machining required for making metal seals. In highly oxidizing environments or services containing amines and/or caustics, other resins may be acceptable owing to their tolerance to such environments. Service temperatures can range from about −320° F. to 500° F.

Referring to FIGS. 4 and 4A, a preferred labyrinth seal 150 is illustrated which includes many of the features of the previously discussed seal 80. The seal 150 includes a first side 152 in alignment with a radial axis and a second side 168 opposite the first side 152, the first and second sides 152 and 168, respectively, each includes a plurality of inclined teeth extending away from the axial axis, and further include an inner-axial surface 184 in alignment with an axial axis and an outer-axial surface 130 opposite said inner-axial surface having at least one purge opening 186 extending through and to the inner-axial surface 184. The inner-axial surface 184 includes a plurality of inclined teeth extending generally toward the axial axis and away from the purge opening 186 and has grooves therebetween.

More particularly, the first side 152 of the labyrinth seal 150, includes an inclined tooth or primary labyrinth 154 and a second inclined tooth or a secondary labyrinth 156, each having apex 158 and 160, respectively. The first side 152 further includes a primary collecting trough 162 which is defined as the area between the outer-axial surface 130 and the primary apex 158, and a secondary collecting trough 164 defined as the area between the primary and secondary apex 158 and 160. On the other side of secondary apex 160 is an inclined surface 166. The second side 168 is similar to first side 156, however the teeth point in equal but opposite directions with respect to the axial axis. The second side 168 includes an inclined tooth or primary labyrinth 170 and an inclined tooth or secondary labyrinth 172 with corresponding primary and secondary apices 174 and 176, respectively. A primary collecting trough 178 is defined as the area between the primary apex 174 and outer-axial surface 130 on the second side 168, and a secondary collecting trough 180 is defined as the area between the primary and secondary apex 174 and 176. On the other side of secondary apex 176 is an inclined surface 182. In a preferred embodiment, the inclined teeth 154 and 156 of first side 152 provide two seals adjacent to the hub 26a of the centrifuge basket 26, and similarly, the inclined teeth 170 and 172 of second side 168 provide two seals adjacent to the flinger 64, for enhanced sealing and reliability. The primary collecting troughs 178 and 162 circumferentially direct oil, liquids, slurry, solids, etc. around and to the feed liquor drain 28 of process housing 14, and to the reservoir in the bottom of lubricating housing 12, respectively. The secondary collecting troughs 164 and 180 provide back ups for the primary collecting troughs 162 and 178, in the event of leakage or damage, and work in the same way by providing a circumferential path around the first and second sides 152 and 168. The angles of the teeth on the first and second sides 152 and 168 can vary widely, and have been configured to throttle inert gas outwardly toward the process and lubricating housing 14 and 12, minimize leakage of slurry or oil, and minimize wear, as previously stated with respect to the seal 80. The ranges of the teeth on first and second sides 152 and 168 are the same as those previously given with respect to the labyrinth seal's 80 teeth on the first and second side 82 and 92 in FIG. 2.

Referring to FIGS. 4 and 4A, the inner-axial surface 184 includes at least one radial purge opening 186 in the middle between the first and second sides 152 and 168. The inner-axial surface 184 includes a plurality of teeth including a first tooth, second tooth, third tooth, fourth tooth, fifth tooth, and sixth tooth, 188, 190, 192, 194, 196, and 198, with corresponding first apex, second apex, third apex, fourth apex, fifth apex, and sixth apex, 200, 202, 204, 206, 208, and 210, respectively. Between the first apex, second apex, third apex, fourth apex, fifth apex, and sixth apex, 200, 202, 204, 206, 208, and 210, is the right channel 212, right-middle channel 214, purge channel 216, left-middle channel 218, and left channel 220. The secondary channels comprise channels 212, 214, 218, and 220. The volume of the primary channel 216 and secondary channels 212, 214, 218, and 220 can vary widely, and the preferred ratios are the same as those previously given with respect to labyrinth seal 80. The throttling effect provided by the teeth of inner axial surface 102 and the five channels 212, 214, 216, 218, and 220, is enhanced due to the higher number of teeth, seals and channels. The angles of such teeth on inner axial surface 184 can vary widely. The preferred angles are the same as those given with respect to the teeth on the inner axial surface 102 of labyrinth seal 80.

The outer axial surface 130 is identical to and has been previously discussed with respect to the seal 80 in FIG. 2.

In use, the labyrinth seal 150 of the instant invention provides a floating feature which minimizes direct contact with any rotating or moving parts or machines, and further provides for relatively simple insertion at least partially in seating means 68. The labyrinth seal 150 is held in position by an interference fit of the O-rings 140, 142, and 144 around the outside diameter or outer-axial surface 130, and is further defined by the hub 26a of centrifuge basket 26 on the first side 156, the flange 26b of the centrifuge basket 26 on the inner axial surface 184, and the flinger 64 on the second side 168.

In a preferred embodiment, the labyrinth seal 150, as does 80, rides on a thin film of inert gas introduced from source 78 through the radial purge openings 186 around the seal. The inert gas is introduced at the center of the labyrinth seal 150 by following the path defined by the purge channel 134, to provide a gaseous blanket, such as a nitrogen blanket in lubricating housing 12 while at the same time substantially assuring proper buffering to minimize leakage of either lubricating oil from the lubricating housing 12 or process fluids from the process housing 14 to the atmosphere or to the adjacent housing 14 and 12.

The primary and secondary teeth 154 and 156 of first side 152 and primary and secondary teeth 170 and 172 of second side 168, have been designed to shed any liquid from the process housing 14 or lubricating housing 12, by a combination of gravity and the centrifugal effect of the rotating members. More particularly, any slurry, liquids, solids, etc. in process housing 14 are caught by the primary collecting trough 162 and directed circumferentially-downwardly, due to gravity, toward the bottom of the labyrinth seal 150, which subsequently drops out of collecting trough 162, again due to gravity, to the feed liquor drain 28 of the process housing 14. In a similar fashion, any liquid, oil, vapor, etc. caught in the primary labyrinth 170 of the second side 168, follows the path of the primary collecting trough 178 due to gravity, and falls, also due to gravity, to the lubricating reservoir at the bottom of the lubricating housing 12. Further, the flange 26b of centrifuge basket 26 rotates in the process housing 14 as does the flinger 64 in the lubricating housing 12 to centrifugally push any liquid or liquids mixed with solids in proximity thereto, away from the labyrinth seal 150 to further minimize leakage. The secondary collecting troughs 164 and 180 have been designed to provide a backup catching trough for catching any liquid and/or solids that might leak from the primary collecting troughs 162 and 178, and work in the same manner as previously discussed with respect to the primary collecting troughs 162 and 178, respectively.

The inner-axial surface 184 with a plurality of teeth, has enough clearance for relatively simple mechanical assembly.

The bumper seals at each end of the labyrinth seal 150 provide a heavy cross-section of material to absorb shock during vibration excursions. Referring to FIG. 1, a first and second bumper means 222 and 224 provide a large cross-sectional area which has been specially configured and designed to be able to withstand axial and radial excursions or vibrations with minimal or no damage to the second, third, fourth, and fifth teeth 190, 192, 194, and 196, respectively, as well as the teeth 154 and 170 on the first and second side 152 and 168, respectively. The first bumper means 222 comprises the inclined tooth 156 with collecting trough 164 on one side and inclined surface 166 leading to the first tooth 188 on the other, and first tooth 188. The second bumper means 224 comprises the inclined tooth 172 with collecting trough 180 on one side and inclined surface 182 leading to the sixth tooth 198 on the other and sixth tooth 198. The first and second bumper means 222 and 224 are strategically located where the first side 152 might meet the inner axial surface 184 and the second side 168 meets the inner axial surface 184, respectively, to withstand the aforementioned excursions, caused by worn out bearings or woven cake on filtration screen 24, for example, to provide a seal on the radial and axial axis.

The clearance between outer-axial surface 130 and the seating means 68 and base plate 62, is a relatively loose fit, preferably about a 30 mils diametral clearance. This design permits the labyrinth seal 150 to float radially and axially thereby allowing the seal to be self-adjusting by carefully following any changes or excursions of outer rotating shaft section 46.

EXAMPLE

A twenty pound blend of 80% by weight poly (amide-imide), Torlon® 4000 TF available from Amoco Performance Products, Inc., 12% by weight 9033 Graphite and 8% by weight Tetra fluoroethylene, Teflon®, was placed in a tray and the tray with the blend was placed in a hot air oven for 18 hours.

The hot air oven temperature included the following: 2 hrs. @ 200° F.; 2 hrs. @ 250° F.; 2 hrs. @ 285° F.; 2 hrs. @ 325° F.; 1 hr. @ 400° F.; and 9 hrs. @ 485° F. A mold was preheated to 350° F. for the last 2 hours (i.e. at the 16th hour) of the above blend drying cycle. The mold at 350° F. was charged with the blend at 485° F. The charged mold was placed in a preheated oven at 500° F. The blend temperature was raised to 512° F. and maintained there for 45 minutes. The mold was then removed from the oven and wrapped with a blanket of insulation minimize heat loss. The mold was next placed in a press and bumped sufficiently to remove the air and gas in the blended material. Bumping as used herein, includes squeezing the mold intermittently by activating and deactivating the hydraulic press which squeezes the mold, to substantially remove the air and gas from the blended material in the mold. The mold was pressurized to 10000 psi and maintained under this pressure for 45 minutes. The pressure was slowly released over 12 minutes and the mold was placed into a preheated oven at 510° F. The blend temperature was then raised to 650° F. for 10 minutes. The mold was removed from the oven and wrapped with an insulation blanket to minimize heat loss. The mold was next placed in the press and the ram was rapidly closed. The blend was pressurized to 10000 psi and held for 6 hours. While still pressurized in the press, the mold was air cooled to 400° F. The pressure was released after 6 hours, and the mold was removed from the press and wrapped to allow the blend to slowly cool over 12 hours as described above. The mold was then reheated to 275° F. wherein an ingot formed from the blend was ejected. The ingot was tubular or donut shaped having a hollow inside, having an outer and inner diameter of 12 and 8 inches, respectively, and is 2 inches thick and 6 inches high. After cooling, the ingot was machined directly into the labyrinth seal 150 of FIG. 3.

A labyrinth seal corresponding to that illustrated at 150 in FIG. 4, was tested in a pusher centrifuge manufactured by the APV Chemical Machinery, Inc., illustrated in FIG. 1. The pusher centrifuge illustrated as 10 in FIG. 1 was selected for the test because of the severe service conditions involved, including severe operating temperatures, pressures, vibrations, etc.

The pusher centrifuge was carefully maintained and monitored so as to be within the factory designated tolerances and clearances. The pusher centrifuge exhibited a smooth acceleration up to running speed with no visible evidence of abnormal vibration below running speed. The hydraulic oil pressure in the lubricating housing was maintained at 650 psi. The centrifuge basket 26 was maintained at its normal speed of 912 RPMs, and the pusher plate 30 was maintained at 27 strokes per minute.

The pressure of labyrinth seal 150 through purge opening 186 was varied during the testing to demonstrate the capabilities of the seal. The pressure data for the labyrinth seal 150 in FIG. 4 was recorded for 3.75 operating hours, as illustrated in Table 1 below. The sealing medium from source 78 was air.

TABLE 1

| Elapsed Time (hours) | Pressure from gas source 78 |
|---|---|
| 2 | 2 psi |
| 1 | 5 psi |
| ½ | 10 psi |
| ¼ | 15 psi |

The data in Table 1, shows that the seal withstood a pressure well above normal operating pressure. During the test, no liquid or oil was observed, leaking, nor was any abnormally high vibration observed. Thereafter, the pusher centrifuge was inspected and no abnormal wear of the labyrinth seal 150 or pusher centrifuge 10 was observed.

Although specific embodiments of this invention have been shown and described, it is to be understood that various modifications and substitutions, as well as rearrangements and combinations of the preceding embodiments, can be made by those skilled in the art without departing from the novel spirit and scope of this invention.

I claim:

1. A floating labyrinth seal comprising:
   a first side in alignment with a radial axis and a second side opposite said first side, said first and said second side each including a generally axially extending inclined tooth, and an inner-axial surface in alignment with an axial axis and an outer-axial surface opposite said inner-axial surface having at least one purge opening extending to said inner-axial surface, said inner-axial surface including at least four teeth each having an apex extending substantially inwardly toward the axial axis having grooves therebetween.

2. The seal of claim 1, wherein said plurality of substantially inwardly extending teeth on said inner-axial surface are at least slightly inclined in a direction pointing away from said purge opening.

3. The seal of claim 1, wherein said teeth are generally wedge shaped.

4. The seal of claim 1, wherein said outer-axial surface has at least one channel.

5. The seal of claim 4, further comprising an O-ring adapted to fit at least partially in at least one of said channels in said outer-axial surface.

6. The seal of claim 1, wherein said seal comprises a poly (amide-imide).

7. The seal of claim 1, wherein said seal comprises a thermoplastic, amide-imide resinous material comprising at least one recurring unit of the following moieties:

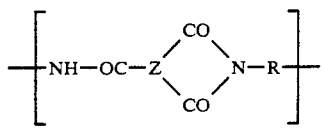

wherein one carbonyl group is meta to and one carbonyl group is para to each amide group and wherein Z is a trivalent benzene ring or lower-alkyl-substituted trivalent benzene ring, R comprises one or more wholly- or largely-aromatic hydrocarbon radicals of from 6 to about 10 carbon atoms or two divalent aromatic hydrocarbon radicals of from 6 to about 10 atoms joined directly or by stable linkages selected from the group consisting of —O—, methylene, —CO—, —SO$_2$—, and —S—.

8. The seal of claim 6 wherein R is

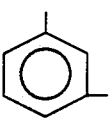

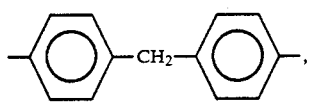

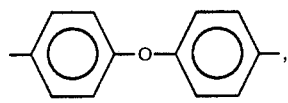

or

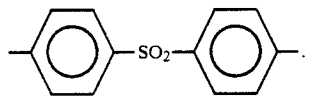

9. A floating labyrinth seal comprising:
a first side in alignment with a radial axis and a second side opposite said first side, said first and said second side each including a plurality of generally axially extending inclined teeth extending away from an axial axis, and an inner-axial surface in alignment with the axial axis and an outer-axial surface opposite said inner-axial surface having at least one purge opening extending to said inner-axial surface, said inner-axial surface including at least four inclined teeth each having an apex extending generally toward the axial axis in a direction pointing away from said purge opening and having grooves therebetween.

10. The seal of claim 9, wherein said plurality of inclined teeth on said first and said second side are disposed at an angle of less than about 50° with respect to the axial axis.

11. The seal of claim 9, wherein said plurality of inclined teeth on said inner-axial surface are disposed at an angle ranging from about 50° to about 85° with respect to the axial axis.

12. The seal of claim 9, further comprising a seating means for allowing said seal to sit at least partially therein.

13. The seal of claim 12, wherein said seating means surrounds and is substantially adjacent to said outer-axial surface of the seal.

14. The seal of claim 12, wherein said outer-axial surface has a plurality of channels.

15. The seal of claim 14, further comprising an O-ring having a first side adapted to fit at least partially in at least one of said channels in said outer-axial surface and a second side adjacent said seating means.

16. The seal of claim 9, wherein said seal comprises a thermoplastic, amide-imide resinous material comprising at least one of the following moieties:

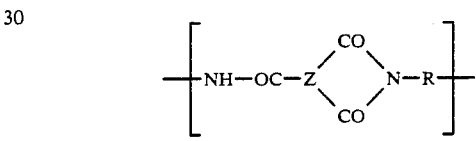

wherein one carbonyl group is meta to and one carbonyl group is para to each amide group and wherein Z is a trivalent benzene ring or lower-alkyl-substituted trivalent benzene ring, R comprises one or more wholly- or largely-aromatic hydrocarbon radicals of from 6 to about 10 carbon atoms or two divalent aromatic hydrocarbon radicals of from 6 to about 10 atoms joined directly or by stable linkages selected from the group consisting of —O—, methylene, —CO—, —SO$_2$—, and —S—.

17. The seal of claim 9, wherein said plurality of teeth are generally wedge shaped and each includes an apex.

18. The seal of claim 9, wherein at least one of said inclined teeth on each of said first and said second side and at least one of said inclined teeth on said inner-axial surface comprise a bumper means for enduring shock and vibrations.

* * * * *